United States Patent Office 2,978,491
Patented Apr. 4, 1961

2,978,491
POLYNITRO CARBAMATES

Milton B. Frankel, Pasadena, Calif., assignor to Aerojet-General Corporation, Azusa, Calif., a corporation of Ohio No Drawing. Filed Jan. 17, 1955, Ser. No. 482,409

20 Claims. (Cl. 260—482)

This invention relates to new compositions of matter and a method for their preparation. In particular, it relates to polynitro-carbamates having the general formula:

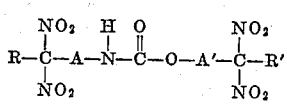

wherein R and R' are alkyl, nitroalkyl or nitro radicals, at least one R being an alkyl or nitroalkyl radical, and A and A' are alkylene radicals.

The compounds of this invention are prepared by condensing a nitro-isocyanate with a nitroalkanol, in accordance with the general reaction scheme set forth below:

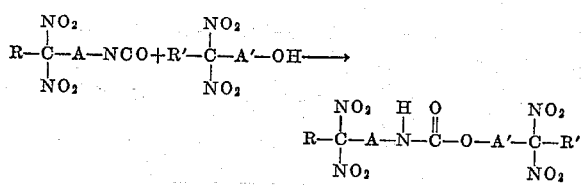

wherein R and R' are nitro, nitroalkyl or alkyl radicals, at least one R being an alkyl or nitroalkyl radical, and A and A' are alkylene radicals. In addition to the new compounds of this invention, this method of preparation is also suitable for preparing polynitro-carbamates such as N-3,3,3-trinitropropyl-2,2,2-trinitroethyl carbamate and N-2,2,2-trinitroethyl-2,2,2-trinitroethyl carbamate, wherein R and R' according to the general formula above are both nitro radicals.

As a matter of convenience, the reaction is usually conducted at reflux temperature. Although the reaction can be performed at lower temperatures, the rate of reaction is ordinarily too slow for practical purposes, while at higher temperatures, the reaction is difficult to control. The reaction is preferably conducted in the presence of a condensation catalyst such as ferric acetylacetonate. Increased smoothness and control of the reaction are achieved when an inert organic solvent such as chloroform is used.

The nitro-isocyanates used as starting materials in this invention are prepared by reacting nitro-acid halides with sodium azide and heating the resultant organic azides under anhydrous conditions to effect their rearrangement to the isocyanates, as disclosed in assignee's copending applications Serial No. 405,515, filed January 21, 1954, now Patent No. 2,923,726, and Serial No. 416,386, filed March 15, 1954, now abandoned. The nitro-acid halides are obtained in the conventional manner by reacting a thionyl halide with a nitro-acid, such as 3,3-dinitrobutanoic and 3,3-dinitropentanoic acid. A wide variety of such nitro-acids are obtained by condensing unsaturated acids, such as acrylic acid, with the nitronate salts of alkanes, as described in the J. Org. Chem., vol. 16, pp. 161–4, 1951.

The nitroalkanols used as starting materials are obtained by condensing nitronate salts of alkanes with formaldehyde to produce nitroalkanols such as 2,2,2-trinitroethyl alcohol and 2,2-dinitropropyl alcohol; or with unsaturated acids as described above to produce nitroacids, the halides of which are reduced by sodium borohydride to nitroalkanols, as disclosed in assignee's copending application Serial No. 392,471, filed November 16, 1953, now abandoned.

To more clearly illustrate this invention, the following examples are presented. It should be understood, however, that these examples are presented merely as a means of illustration and are not intended to limit the scope of the invention in any way.

EXAMPLE I

*Preparation of N-3,3,3-trinitropropyl-2,2,2-trinitroethyl carbamate*

A total of 42.2 gm. (0.192 mole) of redistilled 3,3,3-trinitropropyl isocyanate, 34.7 gm. (0.192 mole) of trinitroethanol and 300 ml. of dry chloroform was placed in a 1-liter, round-bottom flask, fitted with a condenser and drying tube. The solution was refluxed for 48 hours and concentrated in vacuo to give a white solid, which was recrystallized from carbon tetrachloride. The yield of N-3,3,3-trinitropropyl-2,2,2-trinitroethyl carbamate was 62.8 gm. (81.7%), M.P. 77–86° C. A sample was recrystallized again from carbon tetrachloride and then 3 times from ethanol and water to give a white crystalline solid, M.P. 91–92° C., impact stability=50 cm./2 kg. The sample was dried under reduced pressure at room temperature. An elemental analysis of the product is as follows:

Calculated for $C_6H_7N_7O_{14}$: percent C, 17.96; percent H, 1.76; percent N, 24.44. Found: percent C, 18.36; percent H, 1.82; percent N, 23.77.

EXAMPLE II

*Preparation of N,3,3,3-trinitropropyl-2,2-dinitropropyl carbamate*

Equivalent amounts of 3,3,3-trinitropropyl isocyanate and 2,2-dinitropropyl alcohol were refluxed with about 1% by weight ferric acetylacetonate for 8 hours. The solution was then evaporated to dryness in vacuo. The residue was recrystallized from chloroform in 91.7% yield of N-3,3,3-trinitropropyl-2,2-dinitropropyl carbamate, M.P. 103–104° C. The elemental analysis of the product is as follows:

Calculated for $C_7H_{10}N_6O_{12}$: percent C, 23.34; percent H, 2.80; percent N, 23.33. Found: percent C, 22.98; percent H, 2.80; percent N, 22.90.

EXAMPLE III

*Preparation of N-3,3-dinitrobutyl-2,2-dinitropropyl carbamate*

Equivalent quantities of 3,3-dinitrobutyl isocyanate and 2,2-dinitropropyl alcohol were refluxed with about 1% by weight ferric acetylacetonate for 8 hours. The solution was evaporated to dryness in vacuo leaving a quantitative yield of a yellow oil.

EXAMPLE IV

*Preparation of N-3,3-dinitrobutyl-2,2,2-trinitroethyl carbamate*

Equivalent quantities of 3,3-dinitrobutyl isocyanate and 2,2,2-trinitroethyl alcohol were refluxed with about 1% by weight ferric acetylacetonate for 8 hours. The solution was then evaporated to dryness in vacuo leaving a quantitative yield of a yellow oil.

A wide variety of compounds can be prepared in accordance with the procedure set forth in the above examples. N-4,4,4-trinitrobutyl-2,2-dinitropropyl carbamate is prepared by condensing 2,2-dinitropropanol with 4,4,4-trinitrobutyl isocyanate; N-3,3,5,5-tetranitrohexyl-2,2-dinitropropyl carbamate is prepared by condensing 2,2-dinitropropanol with 3,3,5,5-tetranitrohexyl isocyanate; and N-3,3,3-trinitropropyl-3,3,5,5-tetranitrohexyl carbamate is prepared by condensing 3,3,5,5-tetranitrohexanol with 3,3,3-trinitropropyl isocyanate.

It is apparent from the above discussion that any member of the series of polynitro carbamates can be prepared by merely selecting the appropriate polynitro isocyanate and condensing it with a polynitro alcohol in accordance with the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As compositions of matter, the polynitro carbamates having the general formula:

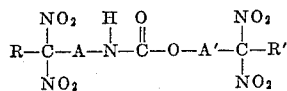

wherein R' and R are radicals selected from the group consisting of lower alkyl, lower polynitroalkyl and nitro radicals, at least one R being of the alkyl and polynitroalkyl series, and A and A' are lower alkylene radicals.

2. As compositions of matter, the polynitro carbamates having the general formula:

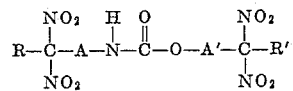

wherein R and R' are lower alkyl radicals and A and A' are lower alkylene radicals.

3. As compositions of matter, the polynitro carbamates having the general formula:

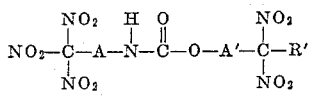

wherein R' is a lower alkyl radical and A and A' are lower alkylene radicals.

4. As compositions of matter, the polynitro carbamates having the general formula:

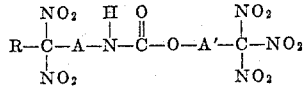

wherein R is a lower alkyl radical and A and A' are lower alkylene radicals.

5. As a composition of matter, N,3,3,3-trinitropropyl-2,2-dinitropropyl carbamate having the structural formula:

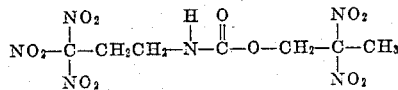

6. As a composition of matter, N-3,3-dinitrobutyl-2,2-dinitropropyl carbamate having the structural formula:

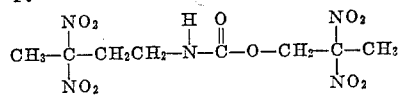

7. As a composition of matter, N-3,3-dinitrobutyl-2,2,2-trinitroethyl carbamate having the structural formula:

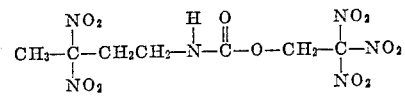

8. As a composition of matter, N-4,4,4-trinitrobutyl-2,2-dinitropropyl carbamate having the structural formula:

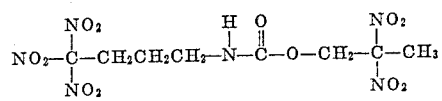

9. As a composition of matter, N-3,3,3-trinitropropyl-3,3,5,5-tetranitrohexyl carbamate having the structural formula:

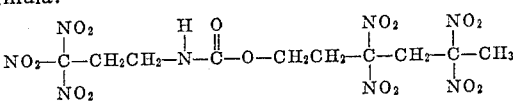

10. As a composition of matter, N-3,3,5,5-tetranitrohexyl-2,2-dinitropropyl carbamate having the structural formula:

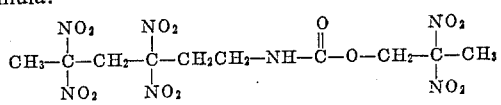

11. The method of preparing polynitro carbamates having the general formula:

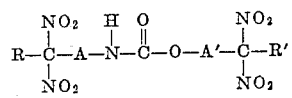

which comprises reacting a polynitro isocyanate having the general formula:

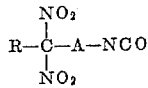

with a polynitro-alkanol having the general formula:

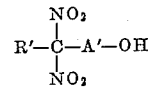

wherein R nad R' are radicals selected from the group consisting of lower alkyl, nitro and lower nitroalkyl radicals and A and A' are lower alkylene radicals.

12. The method of claim 11 wherein the reaction is conducted in the presence of ferric acetylacetonate.

13. The method of claim 12 wherein the reaction is conducted in the presence of an inert solvent.

14. The method of preparing N-3,3,3-trinitropropyl-2,2,2-trinitroethyl carbamate which comprises reacting 3,3,3-trinitropropyl isocyanate with 2,2,2-trinitroethanol.

15. The method of preparing N-3,3,3-trinitropropyl-2,2-dinitropropyl carbamate which comprises reacting 3,3,3-trinitropropyl isocyanate with 2,2-dinitropropanol.

16. The method of preparing N,3,3-dinitrobutyl-2,2,2-trinitroethyl carbamate which comprises reacting 3,3-dinitrobutyl isocyanate with 2,2,2-trinitroethanol.

17. The method of preparing N-3,3-dinitrobutyl-2,2-dinitropropyl carbamate which comprises reacting 3,3-dinitrobutyl isocyanate with 2,2-dinitropropanol.

18. The method of preparing N-4,4,4-trinitrobutyl-2,2-dinitropropyl carbamate which comprises reacting 4,4,4-trinitrobutyl isocyanate with 2,2-dinitropropanol.

19. The method of preparing N-3,3,3-trinitropropyl- 3,3,5,5-tetranitrohexyl carbamate which comprises reacting 3,3,3-trinitropropyl isocyanate with 3,3,5,5-tetranitrohexanol.

20. The method of preparing N-3,3,5,5-tetranitrohexyl-2,2-dinitropropyl carbamate which comprises reacting 3,3,5,5-tetranitrohexyl isocyanate with 2,2-dinitropropanol.

References Cited in the file of this patent

UNITED STATES PATENTS 2,683,728  Mastin et al. _____ July 13, 1954

FOREIGN PATENTS 135,832  Sweden _____ May 27, 1952
138,456  Sweden _____ Dec. 25, 1952

OTHER REFERENCES

Feiser et al.: "Organic Chemistry," D.C. Heath & Co., Boston (1944), page 615.